(12) United States Patent
Yeh et al.

(10) Patent No.: US 6,437,337 B1
(45) Date of Patent: *Aug. 20, 2002

(54) X-RAY DETECTOR SHAPE

(75) Inventors: Lun-Shu Ray Yeh, Berkeley Heights; Joseph Anthony Nicolosi, Bardonia; Alan Devenish, Ramsey, all of NJ (US)

(73) Assignee: Edax, Inc., Mahwah, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/903,784

(22) Filed: Jul. 31, 1997

(51) Int. Cl.[7] .................................................. G01T 1/24
(52) U.S. Cl. ................................................ 250/370.01
(58) Field of Search ...................... 250/370.01, 370.06, 250/370.12, 336.1, 370.14

(56) References Cited

U.S. PATENT DOCUMENTS 4,406,015 A 9/1983 Koga
5,111,052 A * 5/1992 Ohtsuchi et al. ....... 250/370.06
5,268,578 A 12/1993 Yeh
5,677,539 A * 10/1997 Apotovsky et al. .... 250/370.13

FOREIGN PATENT DOCUMENTS

JP 6186344 A 7/1994

OTHER PUBLICATIONS

"Large Area, Low Capacitance Si(Li) Detectors for High Rate X–Ray Applications", IEEE transactions on Nuclear Science, vol. 40, No. 4, Aug. 1993, pp 354–359.

* cited by examiner

Primary Examiner—Constantine Hannaher
(74) Attorney, Agent, or Firm—Armstrong Teasdale LLP

(57) ABSTRACT

A solid state x-ray detector crystal has a body having a front face for receiving incident x-rays. The front face is oblong. A housing about the detector crystal is also oblong. The resulting detector unit fits farther into the gap between the pole pieces of an electron microscope.

2 Claims, 6 Drawing Sheets

X-RAY DETECTOR SHAPE

BACKGROUND OF THE INVENTION

1. Field of the Invention

The invention relates to the field of solid state x-ray detector crystals for use in energy dispersive spectrometry, and in particular to the shape of such detectors.

2. Related art

The invention is an improvement on U.S. Pat. No. 5,268,578 (referred to herein as '578), which is incorporated herein by reference.

The preferred embodiment of the '578 patent was rotationally symmetric. In other words, the detector had a front face on which the x-rays were incident and that face was circular. The detector also had rear face at which x-ray detection signals were supplied for collection. The rear face was also circular.

Use determined that this circular shape was not suitable where space was very limited. Since detectors of this type are commonly used inside electron microscopes or other systems with limited available volume, a better detector shape was desired.

SUMMARY OF THE INVENTION

It is an object of the invention to further improve the shape of the detector over the prior art.

The object is achieved with a detector crystal having a front face with an oblong shape.

BRIEF DESCRIPTION OF THE DRAWING

The invention will now be described by way of non-limitative example with reference to the following figures.

DETAILED DESCRIPTION OF THE PREFERRED EMBODIMENTS

Figure 1:
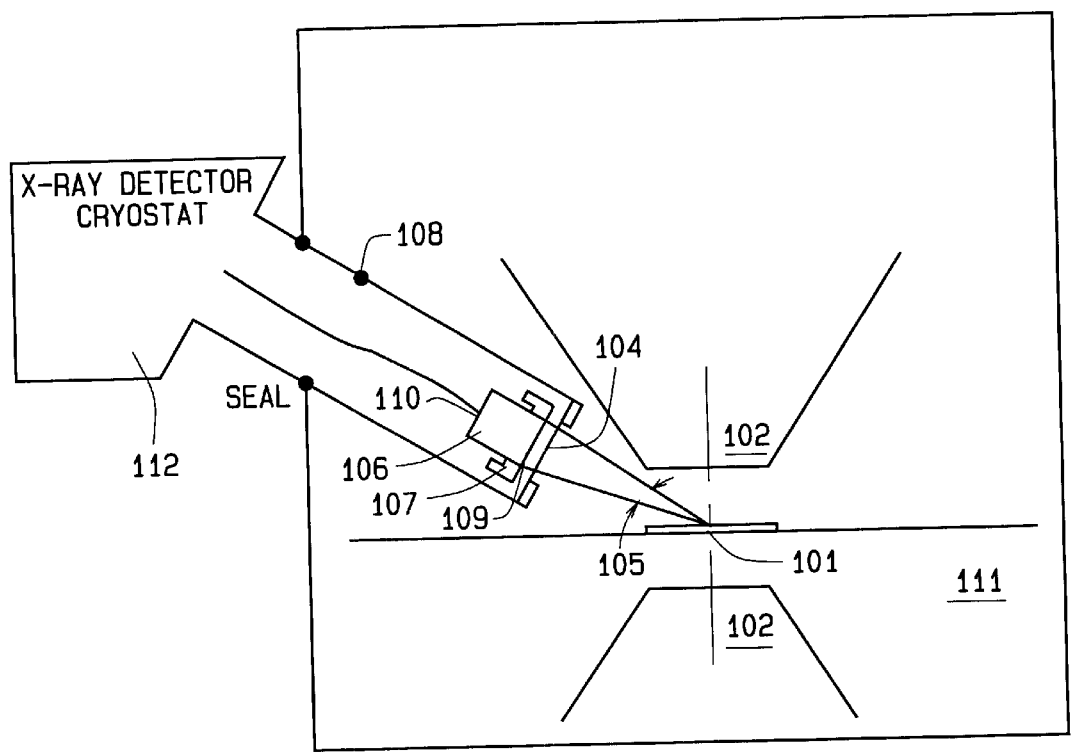
FIG. 1 shows a cross section of an electron microscope with the prior art detector in use.

FIG. 1 shows a cross section of a transmission electron microscope with the prior art detector in use. A sample 101, lying in plane 111, is between pole pieces 102. The sample is bombarded with electrons by the electron microscope and emits x-rays which can be detected by detector unit 103.

The detector unit has an opening 104 which allows a solid angle of x-ray collection 105 at detector crystal 106, 107. In the prior art the crystal was most commonly lithium drifted silicon having an active area 106 and an inactive area 107. The present invention is also applicable to other types of solid state x-ray detector crystals, such as those made from germanium.

The crystal has a front face 109 on which x-rays are incident and a back face 110 at which electrical detection signals are collected. An x-ray detector cryostat 112 maintains cryogenic temperatures.

As can be seen from FIG. 1, the opening between the pole pieces 102 is awkward for insertion of the detector unit. The detecting unit has an evacuated housing 108 which must surround the detector crystal 106, 107. The detector unit is then too bulky to allow placement of the detector crystal immediately adjacent to the sample. Placing the detector crystal closer to the sample provides a larger solid angle of x-ray collection, i.e. improves x-ray collection efficiency, and therefore results in greater throughput and chemical sensitivity.

A smaller detector unit can get closer to the sample, but a smaller detector unit requires a smaller detector crystal. The smaller detector crystal has the disadvantage that its front face has a smaller surface area and therefore collects less x-rays, giving rise to a lower count rate (throughput) and less chemical sensitivity.

The space between the pole pieces 102 is more extensive horizontally than vertically. Therefore, according to the invention, it was determined that a crystal with an oblong face would fit better into the space. "Oblong" herein means that the face is longer in one dimension than another. A detector crystal with an oblong face can have a front surface area which is actually greater than the surface area of a prior art circular detector crystal and still fit into the available space (102). This is achieved by using the same vertical dimension on the front face as the prior art with a larger horizontal dimension. By way of example: a circular crystal of diameter 6.18 mm has a front face of 30 mm$^2$ in area. In certain applications, an oblong crystal of vertical dimension 6.18 mm and horizontal dimension 12.36 mm can be located at the same distance from the sample. In this arrangement, the oblong crystal with a front face area of nearly 65 mm$^2$ collects more than twice the x-ray intensity, from the radiating sample, as would be collected by the 30 mm$^2$ circular detector.

Alternatively, an oblong detector crystal can be placed closer to the sample than a prior art circular crystal of the same surface area could. In either case, improved x-ray collection efficiency ensues.

A third alternative is to construct a detector crystal with a very small area oblong face, but which can be placed extremely close to the sample, thereby increasing collection efficiency. A reduced surface area oblong detector would improve energy resolution because of lower capacitance of the crystal, without any loss of collection efficiency. For example: a crystal of 30 mm$^2$ circular front surface area typically yields 142eV energy resolution. Such a circular detector is usually placed at a distance of 40 mm from the sample, resulting in a solid angle of collection of about 0.019 steradians, where the solid angle is calculated using a linear approximation. By contrast, an oblong detector of only 7.5 mm$^2$ front surface area typically yields an energy resolution of 132 eV when placed at 20 mm from the sample. Both arrangements would have the same solid angle of collection of approximately 0.019 steradians; however, the oblong detector of 7.5 mm$^2$ front (and back) surface area has one fourth the capacitance of a 30 mm$^2$ detector. The smaller oblong crystal therefore will generally provide 10eV better energy resolution than the prior art crystal, where the signal strength is sufficient to allow the smaller detector.

In general, the space available for the detector will vary according to application and from model to model of electron microscope. In view of the disclosure, those of ordinary skill in the art will be able to design detectors of different sizes and shapes according to the space available and the expected signal strength.

Below is a discussion of various shapes that the front face of the crystal according to the invention may assume. Any of these shapes may make use of any of the size tradeoffs discussed above.

Figure 2A:
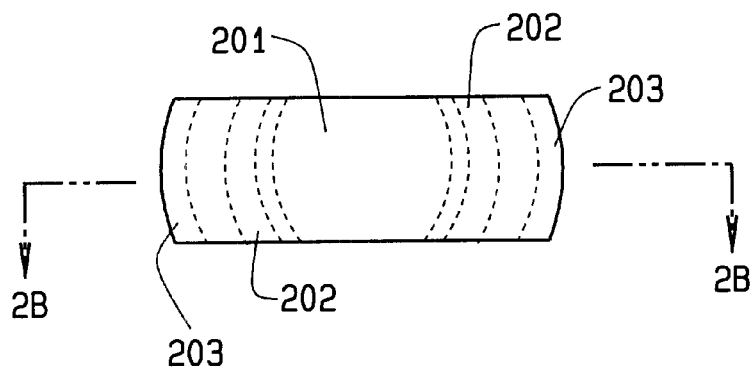
FIGS. 2a–c show a front, top and side views of an x-ray detector according to the invention.

FIG. 2a shows the front face of an oblong detector crystal according to the invention. If the detector is lithium drifted silicon, it will have an active area 201 and an inactive area 202. Normally the inactive area is a contact ring 203 used to receive support structures which hold the detector crystal in place. As taught by the '578 patent, the contact ring can have at least three possible configurations: being a flat brim to give a "top hat" structure; housing a groove to yield a "deep groove" structure; or forming a shallower groove to give the "modified top hat" structure claimed in the '578 patent.

In the embodiment of FIGS. 2 a–c the crystal is cut down from a larger circular crystal. This embodiment is relatively easy to machine. The cut used to produce the crystal is shown as taking away part of the center "active" area 201. However, it may be advantageous to make cuts only in the grooved region 202 and not in the center active area 201. Alternatively, a cut may be made in only one side, leaving an asymmetrical detector which nevertheless conforms better to the space available within the electron microscope.

Figure 2B:
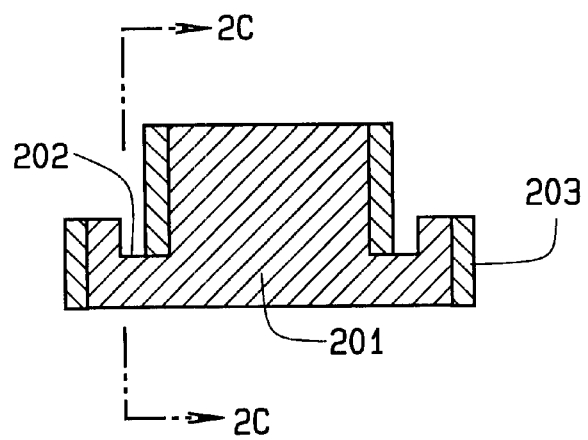

FIG. 2b shows a cross sectional top view of the detector of FIG. 2a. In this view the detector looks much the like the detector of the '578 patent. The center area is partially surrounded by a groove 202 and a rim 203.

Figure 2C:
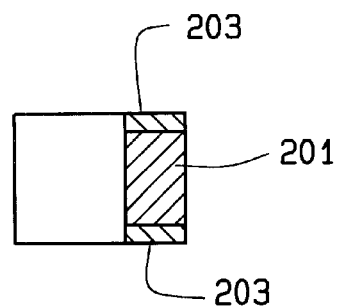

FIG. 2c shows a cross sectional side view of the detector as it would appear in the plane of FIG. 1. With the top and bottom removed, the detector may be positioned so as to make more efficient use of the available space in the electron microscope.

Figure 3A:
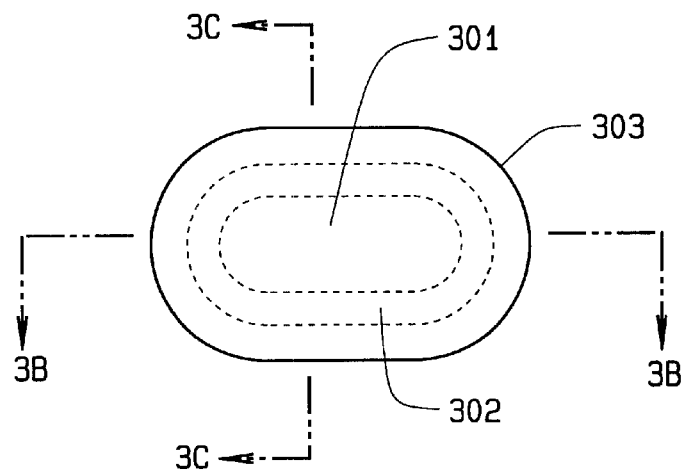
FIGS. 3a–c show front, top and side views of an alternative embodiment of the x-ray detector according to the invention.

FIG. 3a shows the front face of an alternative embodiment of an oblong detector crystal according to the invention. If the detector is lithium drifted silicon, it will have an active area 301 and an inactive area 303. Normally, the inactive area is a contact ring used to receive support structures which hold the detector crystal in place. In this embodiment, the detector structure is fabricated directly into the oblong shape and does not require cutting after processing.

Figure 3B:
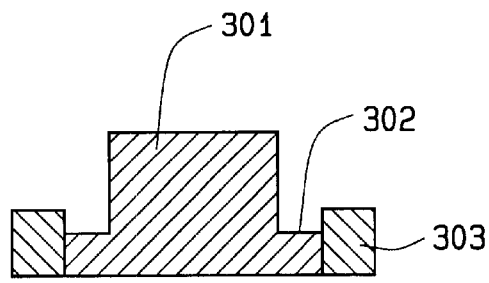

FIG. 3b shows a cross sectional top view of the detector of FIG. 3a. The center active area is 301. The center area is completely surrounded by a groove 302 and a brim 303.

Figure 3C:
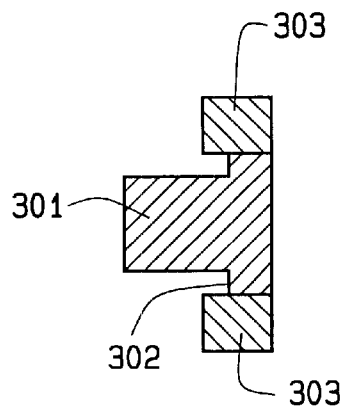

FIG. 3c shows a cross sectional side view of the detector of the alternate embodiment of FIG. 3a. With the vertical dimension of the detector minimized, the detector may be positioned so as to make more efficient use of the available space in the electron microscope.

In another alternative embodiment, the shape of the front surface of the detector can be further altered to form a collection surface which more completely conforms to the space available to the x-ray detector. Since x-rays emanate from a point at the sample, the optimal shape for the x-ray detector crystal may take into consideration the available cross sectional area at various distances from the sample. In some cases, the optimal shape may be a wedge or rhombohedral so as to collect the most useful portion of the available x-ray beam.

In yet another embodiment, the oblong shape, i.e. longer in one dimension than another, might be achieved by a detector with a discontinuous surface. For instance a detector that included a plural adjacent crystals might be easier to machine than a single very long crystal. The adjacent detectors might be of any shape, for instance two small circles or ovals, each having a front surface area substantially smaller than the front surface of the prior art detector, but together having a front surface which was the same or larger than the front surface of the prior art detectors. Plural counting electronics may be needed to collect and process and/or combine results from the plural adjacent detectors.

Figure 4:
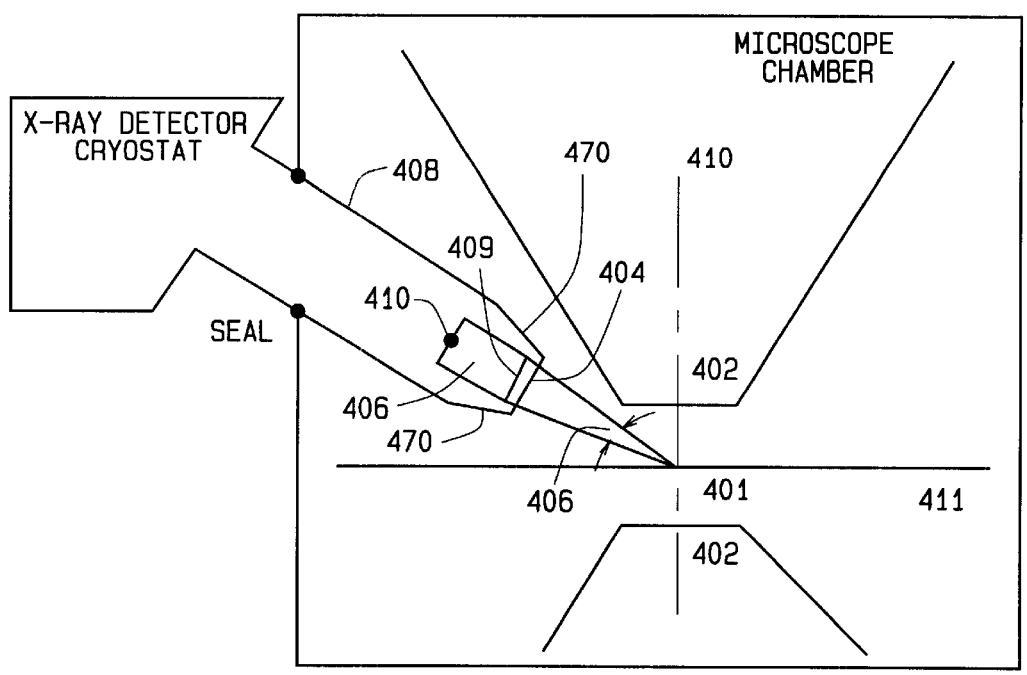
FIG. 4 shows a cross section of an electron microscope with an improved housing for housing the detector in accordance with the invention.
Figure 5A:
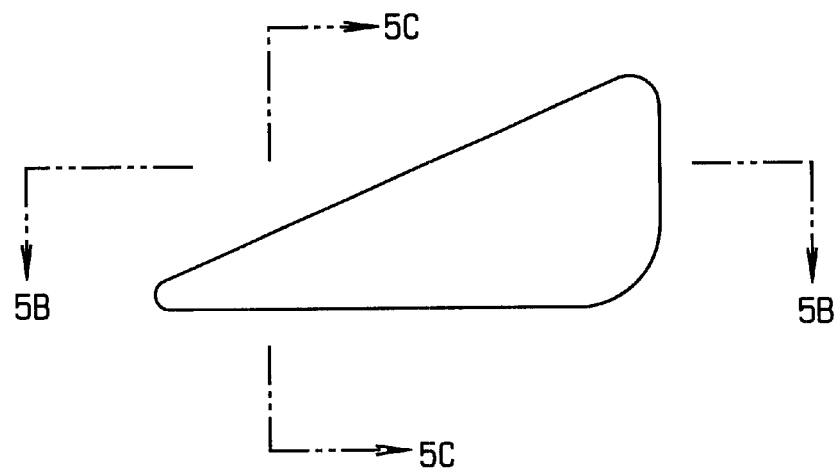
FIGS. 5a–c show front, top and side views of another alternative embodiment of an x-ray detector according to the present invention.
Figure 5B:
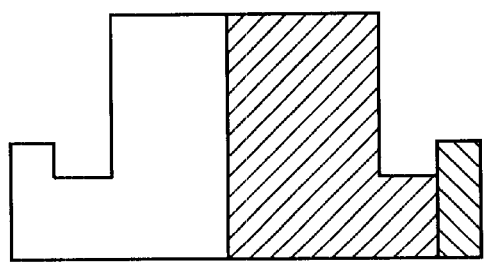
Figure 5C:
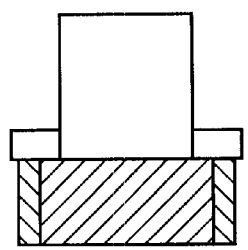
Figure 6A:
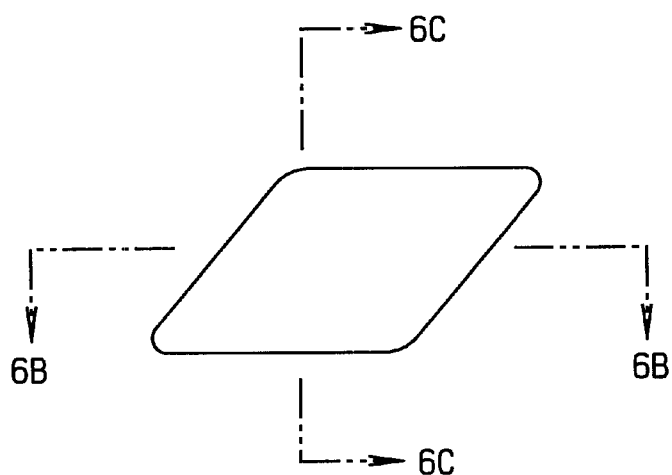
FIGS. 6a–c show front, top and side views of yet another alternative embodiment of an x-ray detector according to the present invention.
Figure 6B:
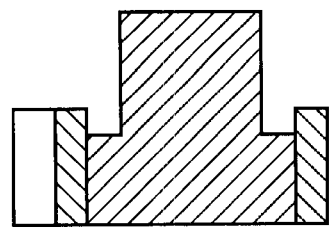
Figure 6C:
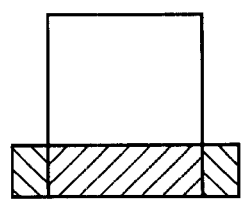

FIG. 4 shows the cross sectional view of a housing provided for the oblong detector of the preferred embodiment. A similar housing may be used for any of the alternative embodiments.

In FIG. 4, the sample 401 is located in the plane 411 between pole pieces 402. An asymmetrical detector 406 appears in a housing 408. The detector 406 achieves a solid angle of collection at its front face 409 and provides electrical signals for collection at a back surface 410. The housing 408 is improved over the prior art housing 108, because the vertical dimensions of the housing conform to the dimensions of the improved detector 409. In other words, the front face of the housing is also oblong. This oblong shape is obtained by the tapering illustrated at 420.

What is claimed is:

1. A solid state x-ray detector crystal having a body with a front face for receiving incident x-rays and a rear face for providing x-ray detection signals, wherein at least the front face has an oblong shape, said body comprising a center portion having an outer periphery, at least a portion of the center portion outer periphery formed by a convex surface, and wherein the front face is oval.

2. An x-ray detector unit comprising:

a solid state x-ray detector crystal having a body with a front face for receiving incident x-rays and a rear face for providing x-ray detection signals, wherein at least the front face has an oblong shape, said body comprising a center portion having an outer periphery, at least a portion of the center portion outer periphery formed by a convex surface, and wherein the front face is oval; and a housing comprising an oval shaped opening for receiving said front face.

* * * * *